(12) United States Patent
Kim et al.

(10) Patent No.: US 12,246,754 B2
(45) Date of Patent: Mar. 11, 2025

(54) METHOD OF CONTROLLING SWITCHING TO MANUAL DRIVING MODE OF AUTONOMOUS VEHICLE

(71) Applicants: Hyundai Motor Company, Seoul (KR); Kia Corporation, Seoul (KR)

(72) Inventors: In Su Kim, Anyang-Si (KR); Myung Ki Yeom, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 211 days.

(21) Appl. No.: 18/085,028

(22) Filed: Dec. 20, 2022

(65) Prior Publication Data

US 2024/0067228 A1 Feb. 29, 2024

(30) Foreign Application Priority Data

Aug. 29, 2022 (KR) .................. 10-2022-0108047

(51) Int. Cl.
*B60W 60/00* (2020.01)
*B60W 10/188* (2012.01)
(Continued)

(52) U.S. Cl.
CPC ...... *B60W 60/0053* (2020.02); *B60W 10/188* (2013.01); *B60W 30/045* (2013.01);
(Continued)

(58) Field of Classification Search
CPC ..... B60K 7/007; B60W 10/08; B60W 10/188; B60W 10/20; B60W 30/045; B60W 30/08;
(Continued)

(56) References Cited

U.S. PATENT DOCUMENTS

| | | | |
|---|---|---|---|
| 6,909,959 B2 * | 6/2005 | Hallowell ............. | B60W 30/02 701/91 |
| 9,925,988 B1 * | 3/2018 | Zwicky ................ | B60W 10/20 |

(Continued)

FOREIGN PATENT DOCUMENTS

| | | | |
|---|---|---|---|
| BR | 112018001990 B1 * | 8/2023 | |
| CA | 2935989 C * | 10/2021 | ............ B60T 13/662 |

(Continued)

OTHER PUBLICATIONS

V. Ivanov and D. Savitski, "Systematization of Integrated Motion Control of Ground Vehicles," in IEEE Access, vol. 3, pp. 2080-2099, 2015, doi: 10.1109/ACCESS.2015.2496108. (https://ieeexplore.ieee.org/document/7312395) (Year: 2015).*

(Continued)

*Primary Examiner* — Atul Trivedi
(74) *Attorney, Agent, or Firm* — Morgan, Lewis & Bockius LLP (57) ABSTRACT

A method of controlling switching to a manual driving mode of an autonomous vehicle allowing stable transition to the manual driving mode and prevention of collision accidents includes performing motor drive control of a motor controller and braking control of a braking controller according to a command of an autonomous driving controller in a complex manner, when there is a risk of a collision accident caused by a difference between a target yaw rate of the autonomous vehicle and an actual yaw rate of the autonomous vehicle in a transition section from an autonomous driving mode to a manual driving mode during turning of the autonomous vehicle.

21 Claims, 7 Drawing Sheets

(51) Int. Cl.
*B60W 30/045* (2012.01)
*B60W 30/095* (2012.01)
*B60W 30/18* (2012.01)
*B60W 40/114* (2012.01)

(52) U.S. Cl.
CPC .. *B60W 30/0956* (2013.01); *B60W 30/18127* (2013.01); *B60W 40/114* (2013.01); *B60W 60/0059* (2020.02); *B60W 2520/14* (2013.01); *B60W 2540/18* (2013.01); *B60W 2720/30* (2013.01)

(58) Field of Classification Search
CPC .......... B60W 30/095; B60W 30/0956; B60W 30/18127; B60W 30/182; B60W 40/114; B60W 60/0015; B60W 60/0053; B60W 60/0059; B60W 2050/0071; B60W 2050/0072; B60W 2520/14; B60W 2540/18; B60W 2720/30
USPC .......................................................... 701/23
See application file for complete search history.

(56) References Cited

U.S. PATENT DOCUMENTS

| | | | |
|---|---|---|---|
| 10,053,074 B2 | 8/2018 | Kindberg | |
| 10,093,292 B2 | 10/2018 | Moore et al. | |
| 2005/0206224 A1* | 9/2005 | Lu | B60T 8/246 303/7 |
| 2005/0206231 A1* | 9/2005 | Lu | B60W 30/02 303/146 |
| 2010/0094511 A1* | 4/2010 | Krueger | B60W 30/18127 180/179 |
| 2016/0368467 A1* | 12/2016 | Hafner | B60D 1/36 |
| 2017/0106869 A1* | 4/2017 | Lavoie | B60T 7/20 |
| 2017/0259817 A1* | 9/2017 | Horiguchi | B60W 50/082 |
| 2017/0313304 A1* | 11/2017 | Shiraishi | B60W 30/04 |
| 2018/0281763 A1* | 10/2018 | Ohmori | B60T 8/17552 |
| 2018/0345978 A1* | 12/2018 | Fujii | B62D 15/0255 |
| 2018/0346026 A1* | 12/2018 | Fujii | B62D 15/025 |
| 2018/0346027 A1* | 12/2018 | Fujii | B62D 15/025 |
| 2018/0350242 A1* | 12/2018 | Fujii | B60W 30/18163 |
| 2019/0184978 A1* | 6/2019 | Park | B60W 10/20 |
| 2019/0367003 A1* | 12/2019 | Okada | B60T 8/1755 |
| 2019/0375401 A1* | 12/2019 | Shimizu | B60W 30/09 |
| 2019/0375402 A1* | 12/2019 | Shimizu | B60W 10/04 |
| 2019/0382015 A1* | 12/2019 | Niu | F16H 61/061 |
| 2020/0047749 A1* | 2/2020 | Morotomi | B60W 30/09 |
| 2020/0180605 A1* | 6/2020 | Boecker | B60W 10/20 |
| 2020/0216085 A1* | 7/2020 | Bobier-Tiu | B60W 40/08 |
| 2020/0247397 A1* | 8/2020 | Kim | B60W 10/20 |
| 2020/0290646 A1* | 9/2020 | Safour | B60W 50/14 |
| 2020/0339095 A1* | 10/2020 | Fullman | B60T 8/172 |
| 2020/0339135 A1* | 10/2020 | Kasaiezadeh Mahabadi | B60W 30/045 |
| 2021/0046912 A1* | 2/2021 | Miller, Jr. | B60T 8/17616 |
| 2021/0139016 A1* | 5/2021 | Horiguchi | B60W 50/0097 |
| 2021/0253087 A1* | 8/2021 | Titus | B62D 35/007 |
| 2021/0284127 A1* | 9/2021 | Mckeown | B60W 40/064 |
| 2021/0291818 A1* | 9/2021 | Barth | B60W 10/18 |
| 2021/0354682 A1* | 11/2021 | Takaira | B60W 10/08 |
| 2021/0357667 A1* | 11/2021 | Zhu | G06T 7/80 |
| 2022/0227354 A1* | 7/2022 | Hagiwara | B60T 8/1755 |
| 2022/0250629 A1* | 8/2022 | Okada | G06V 20/588 |
| 2022/0250630 A1* | 8/2022 | Okada | B60W 40/114 |
| 2023/0022906 A1* | 1/2023 | Balachandran | B60W 10/20 |

FOREIGN PATENT DOCUMENTS

| | | | | |
|---|---|---|---|---|
| CA | 3167491 A1 | * | 1/2024 | |
| CN | 116714579 A | * | 9/2023 | |
| CN | 117657187 A | * | 3/2024 | .......... B60W 10/18 |
| DE | 102023111418 A1 | * | 4/2024 | |
| EP | 3885221 A1 | * | 9/2021 | .......... B60L 15/2009 |
| EP | 4067187 A2 | * | 10/2022 | |
| GB | 2527526 A | * | 12/2015 | |
| JP | 2022132830 A | * | 9/2022 | .......... B60Q 9/008 |
| KR | 2020-0063314 A | | 6/2020 | |
| KR | 2022-0019878 A | | 2/2022 | |
| WO | WO-2014146806 A1 | * | 9/2014 | |
| WO | WO-2023025477 A1 | * | 3/2023 | |
| WO | WO-2023237174 A1 | * | 12/2023 | .......... B60T 8/17551 |

OTHER PUBLICATIONS

Siqi Zhang, Shuwen Zhou and Jun Sun, "Vehicle dynamics control based on sliding mode control technology," 2009 Chinese Control and Decision Conference, Guilin, 2009, pp. 2435-2439, doi: 10.1109/CCDC.2009.5192610. (https://ieeexplore.ieee.org/document/5192610?source=IQplus) (Year: 2009).*

Ivanov, et al., "Systematization of Integrated Motion Control of Ground Vehicles," in IEEE Access, vol. 3, pp. 2080-2099, 2015, doi: 10.1109/ACCESS.2015.2496108. (https://ieeexplore.ieee.org/document/7312395) (Year: 2015).*

Zhang, et al., "Vehicle dynamics control based on sliding mode control technology," 2009 Chinese Control and Decision Conference, Guilin, 2009, pp. 2435-2439, doi: 10.1109/CCDC.2009.5192610. (https://ieeexplore.ieee.org/document/5192610)(Year: 2009).*

* cited by examiner

METHOD OF CONTROLLING SWITCHING TO MANUAL DRIVING MODE OF AUTONOMOUS VEHICLE

CROSS-REFERENCE TO RELATED APPLICATION

The present application claims priority to Korean Patent Application No. 10-2022-0108047 filed on Aug. 29, 2022, the entire contents of which is incorporated herein for all purposes by this reference.

BACKGROUND OF THE PRESENT DISCLOSURE

Field of the Present Disclosure

The present disclosure relates to a method of controlling switching to a manual driving mode of an autonomous vehicle. More particularly, it relates to a method of controlling switching to a manual driving mode of an autonomous vehicle allowing an autonomous driving mode to be switched to a manual driving mode while the autonomous vehicle is turning.

Description of Related Art

A driving mode of the autonomous vehicle includes a manual driving mode in which a driver may directly intervene in driving, in addition to an autonomous driving mode in which a vehicle travels by itself to a destination without the driver directly manipulating a steering wheel, an accelerator pedal, and a brake pedal.

In general, when the driving mode of the autonomous vehicle is switched from the autonomous driving mode to the manual driving mode, a transition section (transition time) of a certain time period exists to ensure stability of control of switching of the driving mode.

When a difference between a target yaw rate and an actual yaw rate of the vehicle occurs in the transition section in which the autonomous driving mode is switched to the manual driving mode during turning of the autonomous vehicle, the vehicle may rapidly become unstable.

For example, in the transition section during transition from the autonomous driving mode to the manual driving mode during turning of the autonomous vehicle, a difference may occur between the target yaw rate of the vehicle according to the autonomous driving mode and the actual yaw rate according to intervention in driving of the driver (for example, steering wheel manipulation). Accordingly, as yaw rate behavior of the vehicle greatly changes, the vehicle may deviate from a driving path and cause a collision accident.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling switching to a manual driving mode of an autonomous vehicle allowing stable transition to the manual driving mode and prevention of collision accidents in the following manner. When there is a risk of a collision accident caused by a difference between a target yaw rate of the autonomous vehicle and an actual yaw rate of the autonomous vehicle in a transition section from an autonomous driving mode to a manual driving mode during turning of the autonomous vehicle, motor drive control of a motor controller and braking control of a braking controller according to a command of an autonomous driving controller are performed in a complex manner. When the autonomous driving controller forcibly changes a steering angle being operated by the driver to prevent a collision accident, the driver may feel a sense of difference in steering operation, and another accident may be caused. Thus, a braking controller is allowed to be controlled.

Various aspects of the present disclosure are directed to providing a method of controlling switching to a manual driving mode of an autonomous vehicle, the method including determining whether there is a request for switching to a manual driving mode during turning of the autonomous vehicle, determining whether a difference occurs between a target yaw rate and an actual yaw rate in a transition section in which an autonomous driving mode is changed to a manual driving mode, determining whether there is a risk of collision on a vehicle movement path on which the autonomous vehicle turns based on the actual yaw rate, determining a yaw rate compensation torque for compensating for a difference between the target yaw rate and the actual yaw rate upon determining that there is a risk of collision, and determining driving torque and regenerative braking torque of each in-wheel motor in the autonomous vehicle for collision prevention and turning stability, or determining whether to apply hydraulic braking torque of a hydraulic braking device according to a magnitude of the yaw rate compensation torque.

In an exemplary embodiment of the present disclosure, the determining of whether there is a risk of collision may include estimating the vehicle movement path of the autonomous vehicle during turning based on the actual yaw rate when the difference between the target yaw rate and the actual yaw rate is equal to or greater than a reference value, and determining whether there is the risk of the collision of the autonomous vehicle with an obstacle or another vehicle on the estimated vehicle movement path.

In another exemplary embodiment of the present disclosure, the determining of whether the difference occurs between the target yaw rate and the actual yaw rate may be performed upon concluding that a steering angle changes due to steering wheel operation of a driver.

In yet another exemplary embodiment of the present disclosure, the target yaw rate may be a yaw rate value during turning along an autonomous driving path predetermined in the autonomous driving mode of the autonomous vehicle, and the actual yaw rate may be a yaw rate value obtained by adding a yaw rate generated by a steering angle change in response to steering wheel operation of a driver to the target yaw rate.

In yet another exemplary embodiment of the present disclosure, upon determining that a change of the steering angle according steering wheel operation of the driver does not occur, switching to the manual driving mode by an autonomous driving controller may be normally controlled, when the difference between the target yaw rate and the actual yaw rate is less than a reference value, switching to the manual driving mode by an autonomous driving controller may be normally controlled, and upon concluding that there is no risk of collision on the estimated vehicle movement path, switching to the manual driving mode by an autonomous driving controller may be normally controlled.

In still yet another exemplary embodiment of the present disclosure, the yaw rate compensation torque may be determined through processes of obtaining a yaw rate difference value, which is an absolute value, by subtracting the actual yaw rate from the target yaw rate, obtaining a yaw rate change rate by dividing the yaw rate difference value by a transition time taking from the autonomous driving mode to the manual driving mode, and multiplying the yaw rate change rate by inertia, which is a predetermined value based on vehicle specifications.

In a further exemplary embodiment of the present disclosure, when the yaw rate compensation torque is less than a predetermined value, switching to the manual driving mode by an autonomous driving controller may be normally controlled.

In another further exemplary embodiment of the present disclosure, when the yaw rate compensation torque is greater than a predetermined value and smaller than a maximum driving torque of the in-wheel motor, an autonomous driving controller may be configured to determine the driving torque and the regenerative braking torque of each in-wheel motor in the autonomous vehicle for collision prevention and turning stability, and instruct a motor controller communicatively connected to the autonomous driving controller to apply the determined driving torque and the determined regenerative braking torque of each in-wheel motor.

In yet another further exemplary embodiment of the present disclosure, when the motor controller performs a control operation to apply the driving torque or the regenerative braking torque to each in-wheel motor based on the driving torque and the regenerative braking torque of each in-wheel motor commanded from the autonomous driving controller, the driving force or the regenerative braking force of each in-wheel motor allowing collision avoidance may be exerted, and when the driving force or the regenerative braking force of each in-wheel motor is exerted, switching to the manual driving mode by the autonomous driving controller may be normally controlled.

In yet another further exemplary embodiment of the present disclosure, when the yaw rate compensation torque is smaller than a sum of a maximum driving torque of the in-wheel motor and the hydraulic braking torque of the hydraulic braking device, the autonomous driving controller may be configured to determine whether to apply the hydraulic braking torque to the hydraulic braking device mounted on each wheel in addition to the driving torque and the regenerative braking torque of each in-wheel motor for preventing collision and achieving stable turning, instruct a motor controller communicatively connected to the autonomous driving controller to apply the determined driving torque and the determined regenerative braking torque of each in-wheel motor, and instruct the braking controller to determine whether to apply the hydraulic braking torque to the hydraulic braking device mounted on each wheel of the autonomous vehicle.

In still yet another further exemplary embodiment of the present disclosure, the motor controller may perform a control operation to apply the driving torque or the regenerative braking torque to each in-wheel motor based on the driving torque and the regenerative braking torque of each in-wheel motor commanded by the autonomous driving controller, and the braking controller may perform a control operation to apply hydraulic braking torque to at least one selected among hydraulic braking devices mounted on respective wheels, so that the driving force or the regenerative braking force of each in-wheel motor allowing collision avoidance is exerted while hydraulic braking force is exerted, and when the driving force or the regenerative braking force of each in-wheel motor is exerted and the hydraulic braking force is exerted on at least one selected among the respective wheels, switching to the manual driving mode by the autonomous driving controller may be normally controlled.

In a still further exemplary embodiment of the present disclosure, when the yaw rate compensation torque is greater than a sum of a maximum driving torque of the in-wheel motor and the hydraulic braking torque of the hydraulic braking device, an autonomous driving controller may perform a control operation to forcibly maintain the autonomous driving mode without changing a driving mode thereof to the manual driving mode.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

In the figures, reference numbers refer to the same or equivalent parts of the present disclosure throughout the several figures of the drawing.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Figure 1:
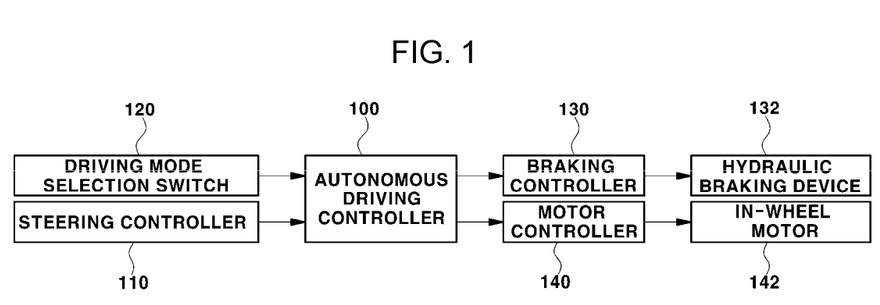
FIG. 1 and FIG. 2 are control configuration diagrams for controlling switching to a manual driving mode of an autonomous vehicle according to an exemplary embodiment of the present disclosure.
Figure 2:
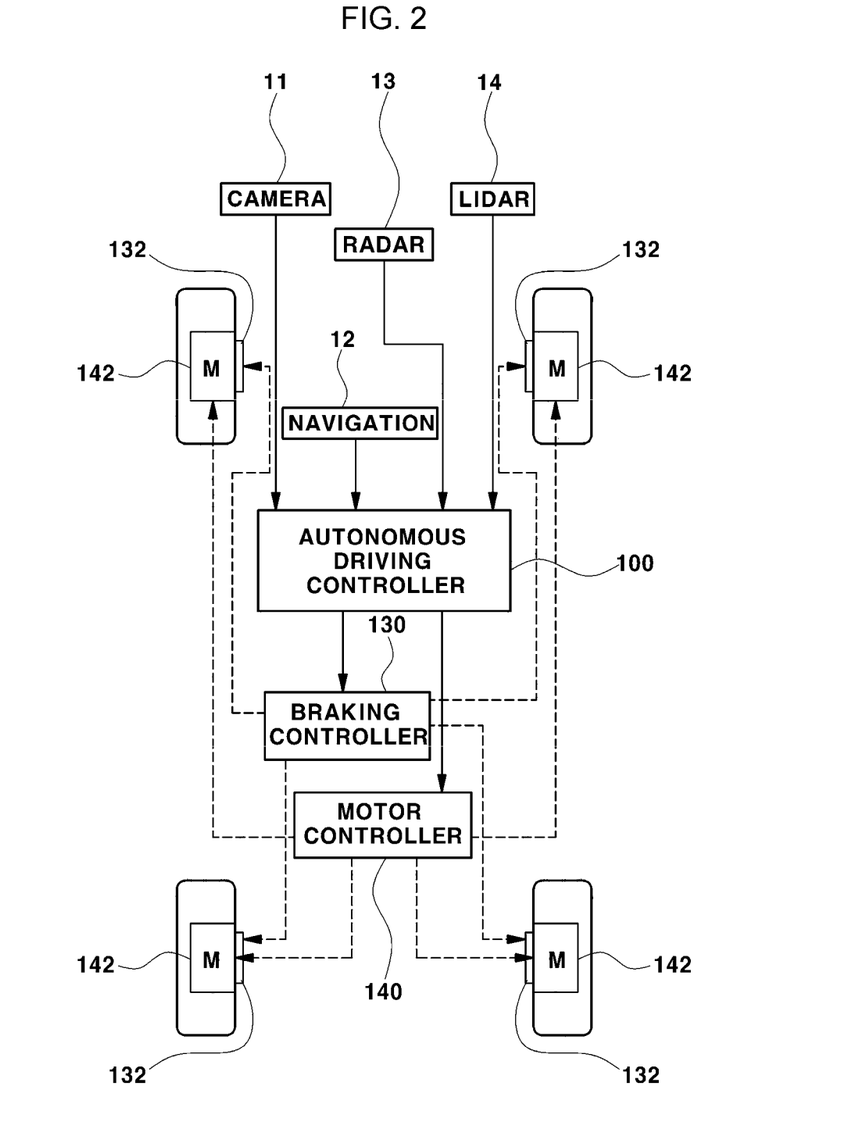

FIG. 1 and FIG. 2 are control configuration diagrams for controlling switching to a manual driving mode of an autonomous vehicle according to an exemplary embodiment of the present disclosure.

As illustrated in FIG. 1 and FIG. 2, the autonomous vehicle is provided with an autonomous driving controller 100 for overall driving control of the autonomous vehicle, a steering controller 110 for reporting whether a steering angle has been generated is connected to an input unit of the autonomous driving controller 100 to transmit a signal, and a braking controller 130 and a motor controller 140 are connected to an output unit of the autonomous driving controller 100 to receive a command signal.

As is well known, the autonomous driving controller 100 is configured to receive various monitoring information necessary for autonomous driving from an autonomous driving sensor including a camera 11, a navigation system 12, radio detection and ranging (RADAR) 13, light imaging detection and ranging (LiDAR) 14, etc. provided in the autonomous vehicle, and perform overall driving control including a driving direction, acceleration, deceleration, etc. of the autonomous vehicle based on the present monitoring information.

Furthermore, the autonomous driving controller 100 is configured to perform a control operation to switch a driving mode to an autonomous driving mode or the manual driving mode according to a switching signal of a driving mode selection switch 120 which may be operated by a driver.

The steering controller 110 is configured to perform steering control according to steering intention according to turning logic of the autonomous driving controller 100 or steering intention according to steering wheel operation, and to determine whether a steering angle changes according to steering wheel operation of the driver in a transition section in which the autonomous driving mode is changed to the manual driving mode during turning of the autonomous vehicle.

For example, the steering controller 110 is configured to determine whether a steering angle is generated according to steering wheel operation of the driver, and transmit a determination result to the autonomous driving controller 100 in the transition section in which the autonomous driving mode is changed to the manual driving mode during turning of the autonomous vehicle.

The braking controller 130 is configured to perform a control operation to apply hydraulic braking torque to a hydraulic braking device 132 mounted on each wheel according to a hydraulic braking torque command from the autonomous driving controller 100.

The braking controller 130 may be an integrated electric brake (IEB) controller including electronic stability control (ESC) for body posture control.

The motor controller 140 is for driving torque control and regenerative braking torque control for an in-wheel motor (WM) 142 mounted on each wheel, and is configured to perform a control operation to apply individual regenerative braking torque and/or driving torque to each in-wheel motor mounted in each wheel according to a driving torque command or a regenerative braking torque command of the autonomous driving controller 100.

When the autonomous driving mode is switched to the manual driving mode during turning of the autonomous vehicle, the autonomous driving controller 100 is configured to determine a difference between a target yaw rate and an actual yaw rate of the autonomous vehicle in response to receiving a steering angle change signal according to steering wheel operation of the driver from the steering controller 110.

In the present instance, the target yaw rate refers to a yaw rate value when turning along an autonomous driving path predetermined by the autonomous driving mode, and the actual yaw rate refers to a yaw rate value obtained by adding a yaw rate generated by a steering angle change according to steering wheel operation of the driver to the target yaw rate.

Furthermore, when there is a difference between the target yaw rate and the actual yaw rate, the autonomous driving controller 100 is configured to determine whether there is a risk of collision on a vehicle movement path of the autonomous vehicle during turning based on the actual yaw rate.

When there is a difference between the target yaw rate and the actual yaw rate, the autonomous driving controller 100 is configured to estimate a vehicle movement path of the autonomous vehicle during turning based on the actual yaw rate compared to a vehicle movement path of the autonomous vehicle during turning based on the target yaw rate based on monitoring information received from the autonomous driving sensor, and to determine whether there is the risk of the collision of the autonomous vehicle with an obstacle or another vehicle on the estimated vehicle movement path.

Furthermore, when there is a risk of collision on the autonomous vehicle movement path when turning based on the actual yaw rate, the autonomous driving controller 100 is configured to determine yaw rate compensation torque $T_C$ for compensating for a difference between the target yaw rate and an actual yaw rate to avoid collision.

For example, the yaw rate compensation torque $T_C$ may be determined through a process of obtaining a yaw rate difference value, which is an absolute value, by subtracting the actual yaw rate from the target yaw rate, a process of obtaining a yaw rate change rate by dividing the yaw rate difference value by a transition time taking from the autonomous driving mode to the manual driving mode, and a process of obtaining the yaw rate compensation torque $T_C$ by multiplying the yaw rate change rate by inertia, which is a predetermined value based on vehicle specifications.

Furthermore, according to the magnitude of the yaw rate compensation torque $T_C$ determined as described above, the autonomous driving controller 100 is configured to instruct the motor controller 140 to apply driving torque and regenerative braking torque of the in-wheel motor, or instruct the braking controller 130 to determine whether to apply the hydraulic braking torque to the hydraulic braking device mounted on each wheel of the autonomous vehicle.

For example, the autonomous driving controller 100 is configured to instruct the motor controller 140 to apply driving torque and regenerative braking torque to each in-wheel motor when the yaw rate compensation torque $T_C$ is greater than or equal to a predetermined value which is a predetermined reference value and is less than maximum driving torque $T_{IWM\_MAX}$ of the in-wheel motor.

Accordingly, when the motor controller 140 performs a control operation to apply driving torque to a selected one among in-wheel motors 142 mounted on respective wheels or to apply regenerative braking torque to the other one or more, the autonomous vehicle may drive along a path where collision may be avoided (for example, a vehicle movement path when turning based on a target yaw rate).

Alternatively, when the yaw rate compensation torque $T_C$ is greater than the maximum driving torque $T_{IWM\_MAX}$ of the in-wheel motor and is smaller than the sum of the maximum driving torque $T_{IWM\_MAX}$ of the in-wheel motor predetermined hydraulic braking torque $T_B$ of the hydraulic braking device, the autonomous driving controller 100 is configured to instruct the motor controller 140 to apply driving torque and regenerative braking torque to each in-wheel motor, and instruct the braking controller 130 to determine whether to apply hydraulic braking torque to the hydraulic braking device mounted on each wheel of the autonomous vehicle.

Accordingly, when the motor controller 140 performs a control operation to apply driving torque to a selected one among the in-wheel motors 142 mounted on respective wheels or to apply regenerative braking torque to the other one or more, and the braking controller 130 performs a control operation to apply the hydraulic braking torque to at least one selected among hydraulic braking devices 132 mounted on the respective wheels, the autonomous vehicle may drive along a path where collision may be avoided (for example, a vehicle movement path when turning based on a target yaw rate).

On the other hand, when the yaw rate compensation torque $T_C$ is greater than the sum of the maximum driving torque $T_{IWM\_MAX}$ of the in-wheel motor and the hydraulic braking torque $T_B$ of the hydraulic braking device, to avoid vehicle collision risk, the autonomous driving controller 100 is configured to perform a control operation to forcibly maintain the autonomous driving mode without changing the driving mode to the manual driving mode to safely drive along the autonomous vehicle movement path when turning based on the target yaw rate.

Meanwhile, when the yaw rate compensation torque $T_C$ is less than a certain value, the autonomous driving controller 100 does not give a torque control command to the in-wheel motor and the hydraulic braking device. The reason is that it is determined that driving is stable on the movement path of the currently turning vehicle similarly to the movement path of the autonomous vehicle during turning based on the target yaw rate.

Here, a method of controlling switching to the manual driving mode of the present disclosure based on the above-described system configuration will be described in order as follows.

If the yaw rate is large when the autonomous vehicle turns in the autonomous driving mode, the risk of the collision with obstacles may be avoided by steering control by the autonomous driving controller. However, when the driver operates the steering wheel in the transition section for switching from the autonomous driving mode to the manual driving mode, a sense of difference in driving due to a change in yaw rate may be greatly generated, and a collision accident may occur due to deviation from the driving path.

Accordingly, the present disclosure utilizes the yaw rate compensation torque in the transition section for switching from the autonomous driving mode to the manual driving mode during turning of the autonomous vehicle to increase a steering wheel operation rate of the driver while gradually reducing the steering angle control intervention by the autonomous driving controller, easily preventing the risk of the collision and the feeling of difference in driving while smoothly shifting to the manual driving mode.

Figure 3:
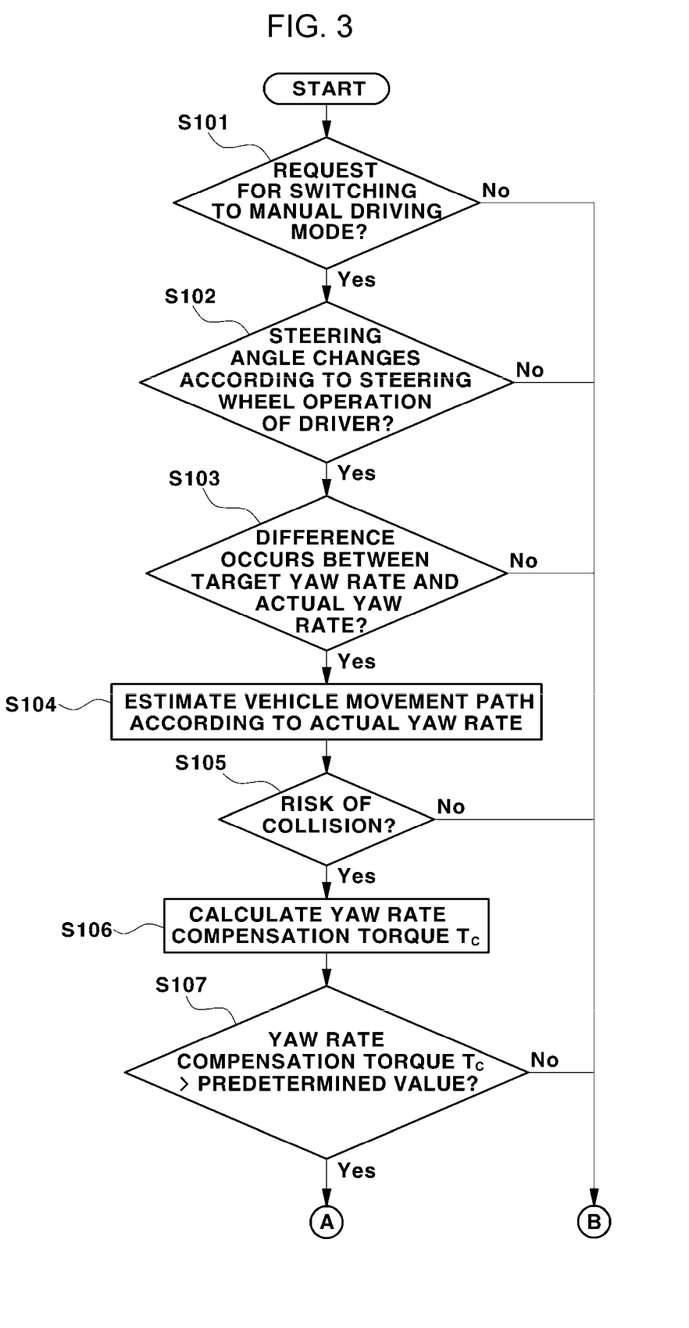
FIG. 3 and FIG. 4 are flowcharts illustrating a method of controlling switching to the manual driving mode of the autonomous vehicle according to an exemplary embodiment of the present disclosure.
Figure 4:
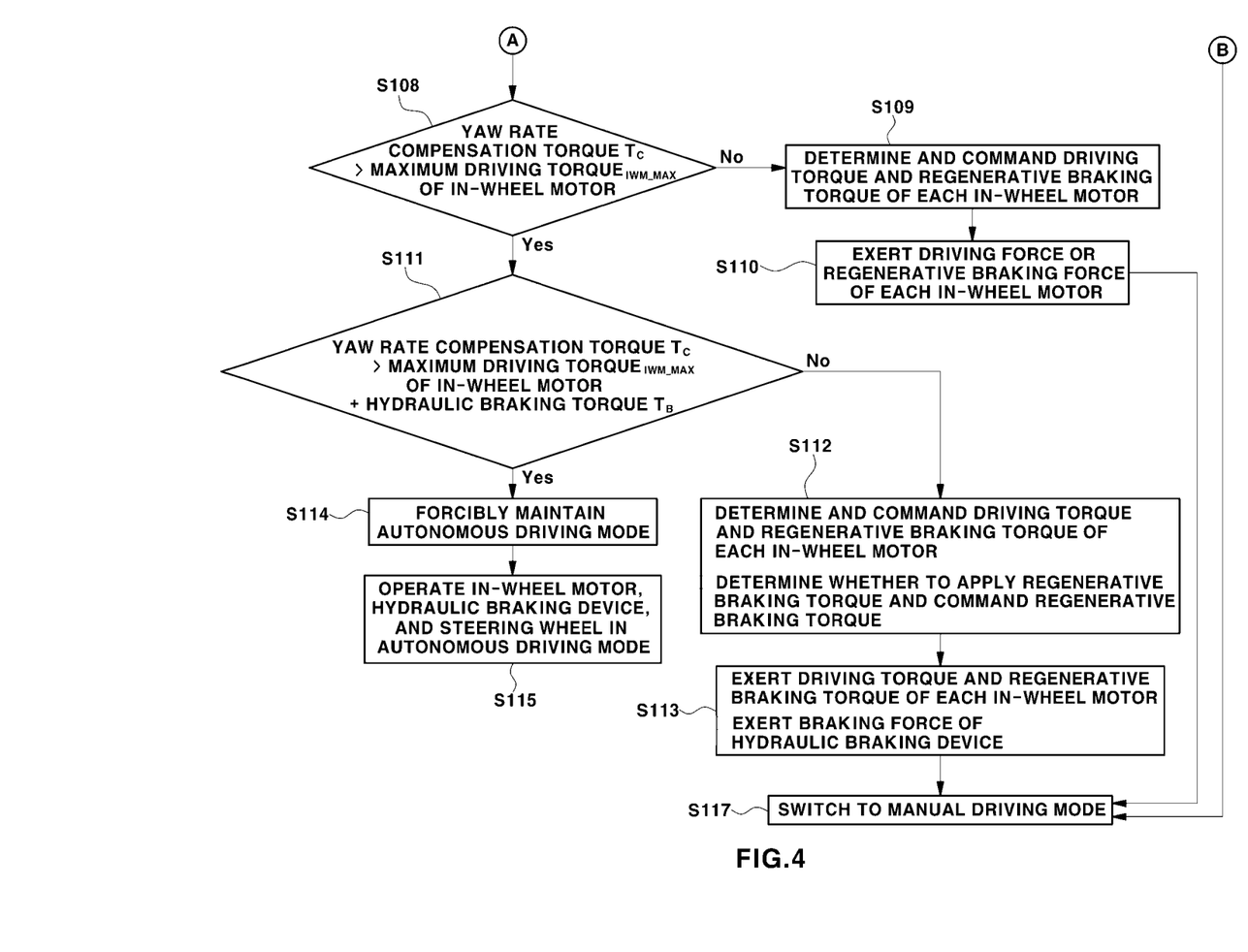

FIG. 3 and FIG. 4 are flowcharts illustrating a method of controlling switching to the manual driving mode of the autonomous vehicle according to an exemplary embodiment of the present disclosure.

First, it is verified whether there is a request for switching to the manual driving mode from the driver during turning of the autonomous vehicle (S101).

For example, when the manual driving mode of the driving mode selection switch 120 is selected and operated, the autonomous driving controller 100 may confirm that there is a request from the driver to switch to the manual driving mode.

Subsequently, when there is a request for switching to the manual driving mode, it is determined whether a steering angle changes according to steering wheel operation of the driver during turning of the autonomous vehicle (S102).

For example, in the transition section in which the driving mode is being switched from the autonomous driving mode to the manual driving mode during turning of the autonomous vehicle, the steering controller 110 may determine whether a steering angle is generated according to steering wheel operation of the driver, and transmit a determination result to the autonomous driving controller 100.

Subsequently, upon determining that the steering angle changes according to steering wheel operation of the driver, it is determined whether there is a difference between the target yaw rate and the actual yaw rate to verify whether a difference occurs between a predetermined vehicle movement path (target movement path) of the autonomous vehicle and a vehicle movement path (current movement path) when the steering angle is changed according to steering wheel operation of the driver (S103).

In the present instance, the target yaw rate refers to a yaw rate value when turning along an autonomous driving path predetermined by the autonomous driving mode, and the actual yaw rate refers to a yaw rate value obtained by adding a yaw rate generated by a steering angle change according to steering wheel operation of the driver to the target yaw rate.

For example, the autonomous driving controller 100 may know the actual yaw rate generated by the change of the steering angle compared to the predetermined target yaw rate based on a detection signal of a yaw rate sensor, etc., knowing that there is a difference between the target yaw rate and the actual yaw rate.

Accordingly, when the difference between the target yaw rate and the actual yaw rate is equal to or greater than a reference value as a result of the determination in S103, the autonomous driving controller 100 may determine that a difference occurs between a predetermined vehicle movement path (target movement path) of the autonomous vehicle and a vehicle movement path (current movement path) when the steering angle is changed according to steering wheel operation of the driver.

On the other hand, when it is determined that the steering angle does not change according to steering wheel operation of the driver as a result of determination in step S102, it is determined that the autonomous vehicle may be driven along a predetermined vehicle movement path (target movement path), and switching to the manual driving mode may be normally performed by the autonomous driving controller (S117).

Furthermore, when the difference between the target yaw rate and the actual yaw rate is less than the reference value as a result of the determination in step S103, it is determined that the autonomous vehicle may be driven stably without significantly deviating from the predetermined vehicle movement path (target movement path), and switching to the manual driving mode by the autonomous driving controller may be normally controlled (S117).

Next, when the difference between the target yaw rate and the actual yaw rate in the autonomous driving controller 100 is equal to or greater than the reference value, the autonomous vehicle movement path during turning is estimated based on the actual yaw rate (S104).

For example, the autonomous driving controller 100 may estimate the movement path of the autonomous vehicle during turning based on the actual yaw rate based on various monitoring information received from the autonomous driving sensor including the camera 11, the navigation 12, the RADAR 13 or the LiDAR 14, etc.

Subsequently, it is determined whether there is a risk of collision when the autonomous vehicle travels on the estimated vehicle movement path as described above (S105).

When the difference between the target yaw rate and the actual yaw rate is greater than or equal to the reference value, the autonomous driving controller 100 may estimate the autonomous vehicle movement path during turning based on the actual yaw rate compared to the autonomous vehicle movement path during turning based on the target yaw rate based on monitoring information received from the autonomous driving sensor, and determine whether there is a risk of collision of the autonomous vehicle with an obstacle or another vehicle on the estimated vehicle movement path.

When it is determined that there is no risk of collision with an obstacle or another vehicle on the estimated vehicle movement path as a result of the determination in step S105, switching to the manual driving mode by the autonomous driving controller may be normally controlled (S117).

On the other hand, when it is determined that there is a risk of collision with an obstacle or another vehicle on the estimated vehicle movement path as a result of the determination in step S105, the autonomous driving controller 100 determines the yaw rate compensation torque $T_C$ for compensating for the difference between the target yaw rate and the actual yaw rate to avoid collision (S106).

For example, the yaw rate compensation torque $T_C$ may be determined through a process of obtaining a yaw rate difference value, which is an absolute value, by subtracting the actual yaw rate from the target yaw rate (target yaw rate−actual yaw rate), a process of obtaining a yaw rate change rate by dividing the yaw rate difference value by a transition time taking from the autonomous driving mode to the manual driving mode (yaw rate difference value/transition time), and a process of obtaining the yaw rate compensation torque $T_C$ by multiplying the yaw rate change rate by inertia, which is a predetermined value based on vehicle specifications (yaw rate change rate×inertia).

Next, the autonomous driving controller 100 determines the driving torque and the regenerative braking torque of each in-wheel motor for collision avoidance and turning stability according to the magnitude of the yaw rate compensation torque $T_C$ determined as above, and then issues a command to the motor controller 140, and determines whether to apply the hydraulic braking torque of the hydraulic braking device, and then issues a command to the braking controller 130.

To the present end, first, the autonomous driving controller 100 compares the yaw rate compensation torque $T_C$ with a predetermined value which is a predetermined reference value (S107).

When the yaw rate compensation torque $T_C$ is less than a predetermined value as a result of comparison in step S107, it is determined that the current autonomous vehicle is in a state where the autonomous vehicle may be driven stably without significantly deviating from the predetermined vehicle movement path (target movement path), and switching to the manual driving mode by the autonomous driving controller may be normally controlled (S117).

On the other hand, when the yaw rate compensation torque $T_C$ is greater than the predetermined value as a result of comparison in step S107, the autonomous driving controller 100 compares the yaw rate compensation torque $T_C$ with the maximum driving torque $T_{IWM\_MAX}$ of the in-wheel motor (S108).

When the yaw rate compensation torque $T_C$ is less than the maximum driving torque $T_{IWM\_MAX}$ of the in-wheel motor as a result of the comparison in step S108, the autonomous driving controller 100 determines the driving torque and the regenerative braking torque of each in-wheel motor that can prevent collision and achieve stable turning, and instructs the motor controller 140 to apply the determined driving torque and the determined regenerative braking torque of each in-wheel motor (S109).

Subsequently, when the motor controller 140 performs a control operation to apply the driving torque or the regenerative braking torque to each in-wheel motor 142 based on the driving torque and the regenerative braking torque of each in-wheel motor commanded from the autonomous driving controller 100, the driving force or the regenerative braking force of each in-wheel motor 142 may be exerted (S110).

Figure 5:
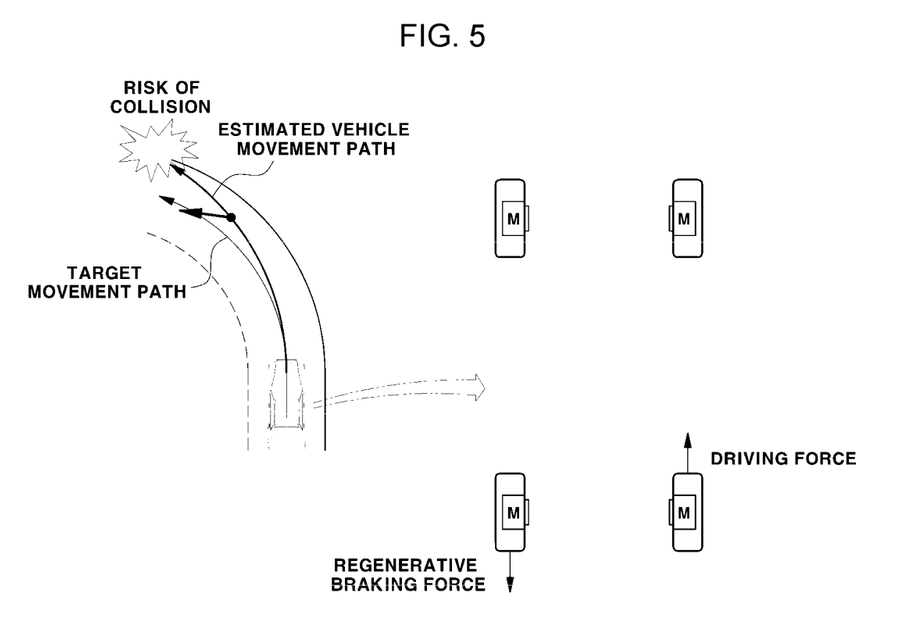
FIG. 5 and FIG. 6 are schematic diagrams illustrating examples in which driving force and regenerative braking force of an in-wheel motor are exerted to switch to the manual driving mode of the autonomous vehicle according to an exemplary embodiment of the present disclosure.

For example, as shown in FIG. 5, when the autonomous vehicle travels along the estimated vehicle movement path and there is a risk of collision with an obstacle or another vehicle, the regenerative braking force of the rear left in-wheel motor 142 is exerted, and the driving force of the rear right in-wheel motor 142 is exerted, so that the autonomous vehicle may be safely driven along a path where collision may be avoided, that is, a predetermined vehicle movement path (target movement path).

Figure 6:
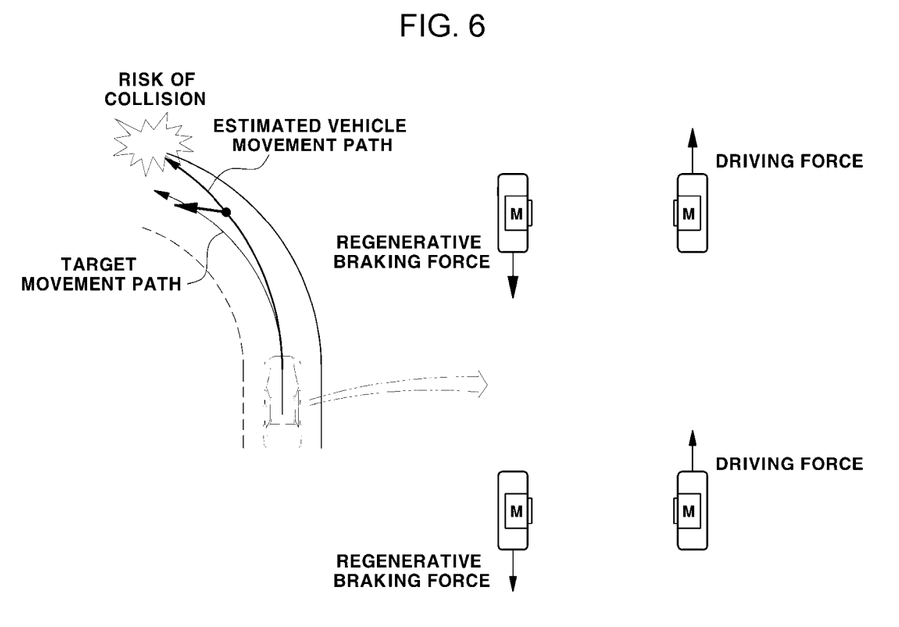

Alternatively, as shown in FIG. 6, when the autonomous vehicle travels along the estimated vehicle movement path and there is a risk of collision with an obstacle or another vehicle, the regenerative braking force of the front and rear left in-wheel motors 142 is exerted, and the driving force of the front and rear right in-wheel motors 142 is exerted, so that the autonomous vehicle may be safely driven along a path where collision may be avoided, that is, a predetermined vehicle movement path (target movement path).

Therefore, as the driving force or the regenerative braking force of each in-wheel motor 142 is exerted as described above, it is determined that the current autonomous vehicle is in a state where the autonomous vehicle may be driven stably without significantly deviating from the predetermined vehicle movement path (target movement path), and switching to the manual driving mode by the autonomous driving controller 100 may be normally controlled (S117).

Meanwhile, when the yaw rate compensation torque $T_C$ is greater than the maximum driving torque $T_{IWM\_MAX}$ of the in-wheel motor as a result of comparison in step S108, it is determined that the autonomous vehicle body posture control for collision avoidance is insufficient only with the driving force and regenerative braking force of the in-wheel motor, and the autonomous driving controller 100 compares the yaw rate compensation torque $T_C$ with the sum of the maximum driving torque $T_{IWM\_MAX}$ of the in-wheel motor and the hydraulic braking torque $T_B$ of the hydraulic braking device (S111).

When the yaw rate compensation torque $T_C$ is smaller than the sum of the maximum driving torque $T_{IWM\_MAX}$ of the in-wheel motor and the hydraulic braking torque $T_B$ of the hydraulic braking device as a result of the comparison in step S111, the autonomous driving controller 100 determines whether to apply the hydraulic braking torque to the hydraulic braking device mounted on each wheel in addition to the driving torque and the regenerative braking torque of each in-wheel motor that can prevent collision and achieve stable turning, instructs the motor controller 140 to apply the determined driving torque and the determined regenerative braking torque of each in-wheel motor, and at the same time, instructs the braking controller 130 to determine whether to apply the hydraulic braking torque to the hydraulic braking device mounted on each wheel (S112).

Subsequently, when the motor controller 140 performs a control operation to apply the driving torque or the regenerative braking torque to each in-wheel motor 142 based on the driving torque and the regenerative braking torque of each in-wheel motor commanded from the autonomous driving controller 100, the driving force or the regenerative braking force of each in-wheel motor 142 may be exerted. At the same time, when the braking controller 130 performs a control operation to apply the hydraulic braking torque to at least one selected among the hydraulic braking devices 132 mounted on each wheel, hydraulic braking force may be exerted on the selected one or more of the wheels (S113).

Figure 7:
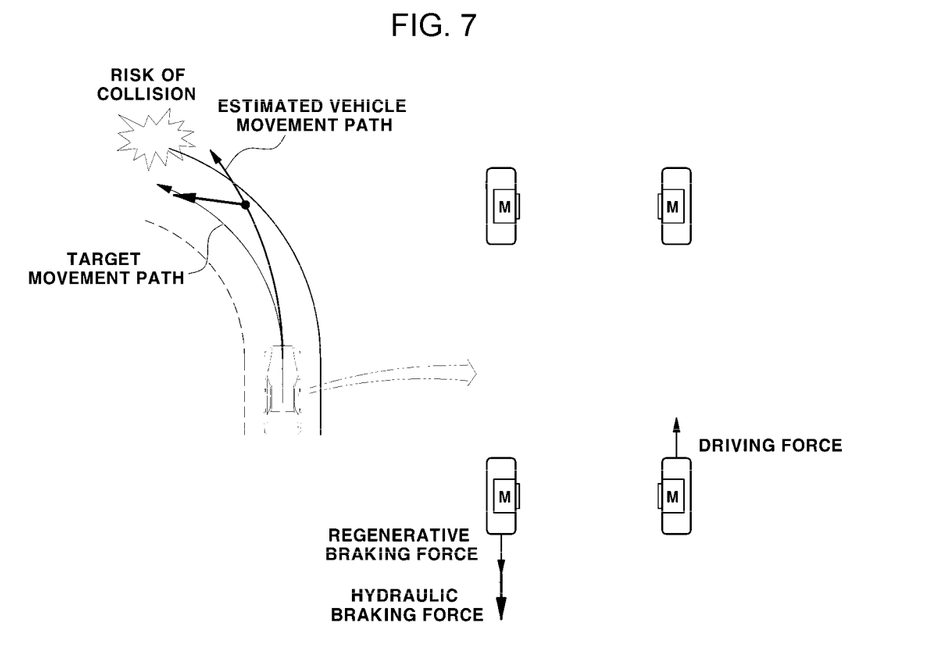
FIG. 7 and FIG. 8 are schematic diagrams illustrating examples in which hydraulic braking force is exerted in addition to the driving force and regenerative braking force of the in-wheel motor to switch to the manual driving mode of the autonomous vehicle according to an exemplary embodiment of the present disclosure.

For example, as shown in FIG. 7, when the autonomous vehicle travels along the estimated vehicle movement path and there is a risk of collision with an obstacle or another vehicle, the regenerative braking force of the rear left in-wheel motor 142 is exerted, the hydraulic braking force of the hydraulic braking device mounted on the rear left wheel is exerted, and the driving force of the rear right in-wheel motor 142 is exerted, so that the autonomous vehicle may be safely driven along a path where collision may be avoided, that is, a predetermined vehicle movement path (target movement path).

Figure 8:
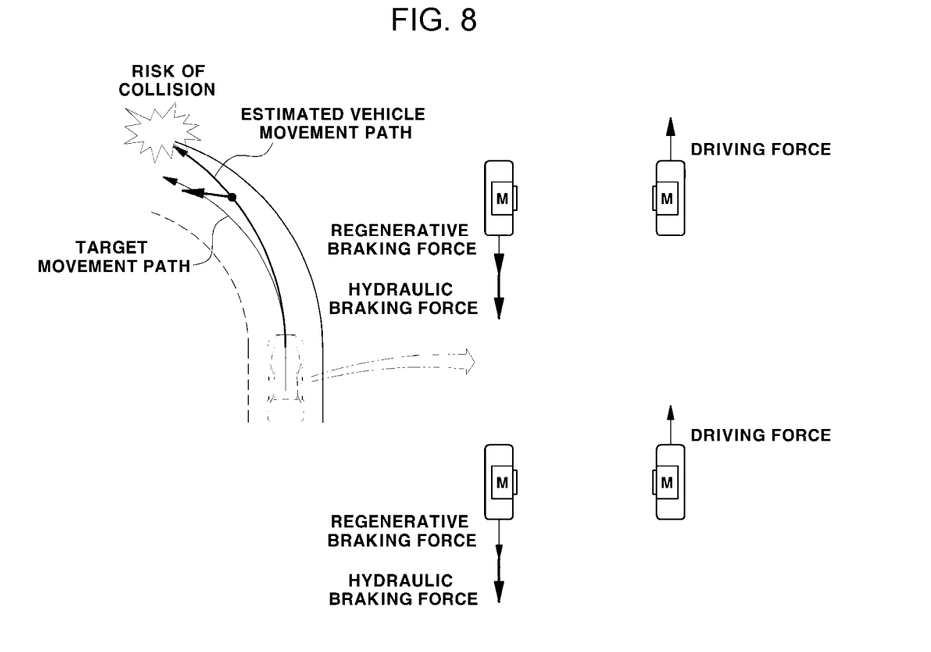

Alternatively, as shown in FIG. 8, when the autonomous vehicle travels along the estimated vehicle movement path and there is a risk of collision with an obstacle or another vehicle, the regenerative braking force of the front and rear left in-wheel motors 142 is exerted, the hydraulic braking force of the hydraulic braking device mounted on the front and rear left wheels is exerted, and the driving force of the front and rear right in-wheel motors 142 is exerted, so that the autonomous vehicle may be safely driven along a path where collision may be avoided, that is, a predetermined vehicle movement path (target movement path).

Therefore, as the driving force or the regenerative braking force of each in-wheel motor 142 is exerted as described above, and hydraulic braking force is exerted on at least one selected wheel among the respective wheels, it is determined that the current autonomous vehicle is in a state where the autonomous vehicle may be driven stably without significantly deviating from the predetermined vehicle movement path (target movement path), and switching to the manual driving mode by the autonomous driving controller 100 may be normally controlled (S117).

Meanwhile, when the yaw rate compensation torque $T_C$ is greater than the sum of the maximum driving torque $T_{IWM\_MAX}$ of the in-wheel motor and the hydraulic braking torque $T_B$ of the hydraulic braking device as a result of comparison in step S111, the autonomous driving controller 100 determines that driving direction and vehicle body posture control for collision avoidance is insufficient only with the driving force, regenerative braking force, and hydraulic braking force of the in-wheel motor, and performs a control operation to forcibly maintain the autonomous driving mode without changing the driving mode to the manual driving mode (S114).

That is, the autonomous driving controller 100 performs a control operation to forcibly maintain the autonomous driving mode without changing the driving mode to the manual driving mode so that the autonomous vehicle is safely driven along the autonomous vehicle movement path during turning based on the target yaw rate to avoid the risk of the collision of the autonomous vehicle.

Figure 9:
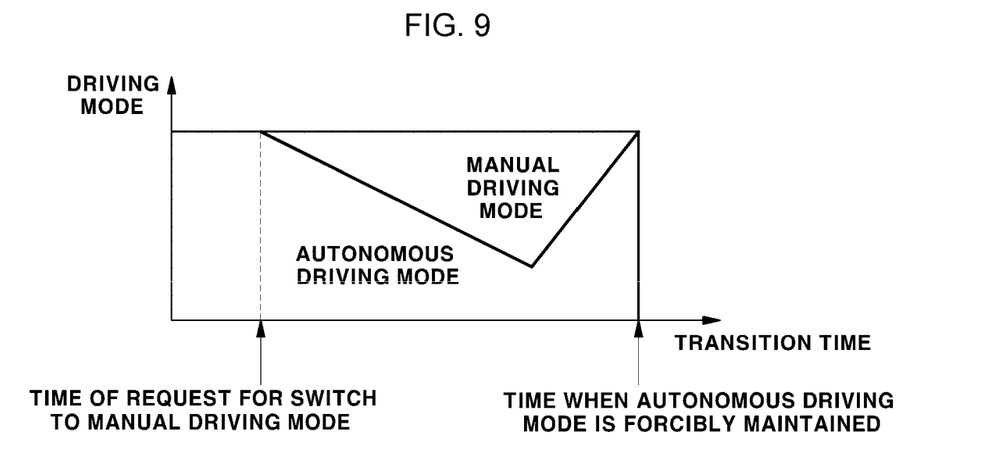
FIG. 9 is a graph illustrating a control example of forcibly maintaining an autonomous driving mode while controlling switching to the manual driving mode of the autonomous vehicle according to an exemplary embodiment of the present disclosure.

Referring to FIG. 9, when there is a risk of collision during the transition time in which the driving mode is fully changed to the manual driving mode from a time of requesting the manual driving mode during turning of the autonomous vehicle, the autonomous driving mode is forcibly maintained without changing to the manual driving mode.

To the present end, by the autonomous driving mode by the autonomous driving controller 100, the driving force and regenerative braking force of the in-wheel motor, the hydraulic braking force by the hydraulic braking device, the steering angle of the steering wheel, etc. may be adjusted to a level at which the autonomous driving vehicle may be safely driven on a path where collision may be avoided, that is, a predetermined vehicle movement path (target movement path) (S115).

For example, when the autonomous driving controller 100 instructs the steering controller 110 to apply a steering angle signal allowing the autonomous driving vehicle to avoid collision, instructs the braking controller 130 to determine whether to apply the hydraulic braking torque of each wheel configured for avoiding collision of the autonomous vehicle, and instructs the motor controller 140 to apply the driving torque and the regenerative braking torque of each in-wheel motor configured for avoiding collision of the autonomous vehicle, the driving force and regenerative braking force of the in-wheel motor, the hydraulic braking force by the hydraulic braking device, the steering angle of the steering wheel, etc. may be adjusted to a level at which the autonomous driving vehicle may be safely driven on a path where collision may be avoided, that is, a predetermined vehicle movement path (target movement path).

Accordingly, it is possible to safely drive the autonomous vehicle without the risk of the collision along a predetermined vehicle movement path when the autonomous vehicle turns based on the target yaw rate based on the autonomous driving mode.

As seen above, when the autonomous driving mode is switched to the manual driving mode during turning of the autonomous driving vehicle, when a difference between the target yaw rate and the actual yaw rate occurs due to generation of a steering angle according to steering wheel operation of the driver, by selectively applying driving torque or regenerative braking torque to each in-wheel motor using the yaw rate compensation torque, or by performing a control operation to further apply selective hydraulic braking torque to each wheel, switching to the manual driving mode may be easily performed, and the autonomous vehicle may be safely driven along a path allowing collision avoidance.

Through the means for solving the above problems, various aspects of the present disclosure are directed to providing the following effects.

First, when the autonomous driving mode is switched to the manual driving mode during turning of the autonomous vehicle, if a difference between the target yaw rate and the actual yaw rate occurs due to generation of a steering angle according to steering wheel operation of the driver, by performing a control operation to selectively apply the driving torque or the regenerative braking torque to each in-wheel motor using the yaw rate compensation torque, switching to the manual driving mode may be easily performed, and the autonomous vehicle may be safely driven along a path allowing collision avoidance.

Second, when the autonomous driving mode is switched to the manual driving mode during turning of the autonomous vehicle, when a difference between the target yaw rate and the actual yaw rate occurs due to generation of a steering angle according to steering wheel operation of the driver, by performing a control operation to apply selective hydraulic braking force to each wheel in addition to a control operation to selectively apply the driving torque or the regenerative braking torque to each in-wheel motor using the yaw rate compensation torque, switching to the manual driving mode may be easily performed, and the autonomous vehicle may be safely driven along a path allowing collision avoidance.

Third, when the autonomous driving mode is switched to the manual driving mode during turning of the autonomous vehicle, if there is a risk of collision, by forcibly maintaining the autonomous driving mode without switching to the manual driving mode, the autonomous vehicle may be safely driven along a path allowing collision avoidance.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling switching to a manual driving mode of an autonomous vehicle, the method comprising:
   determining, by an autonomous driving controller, whether there is a request for switching to the manual driving mode during turning of the autonomous vehicle;
   determining, by the autonomous driving controller, whether a difference occurs between a target yaw rate and an actual yaw rate in a transition section in which an autonomous driving mode is changed to the manual driving mode;

determining, by the autonomous driving controller, whether there is a risk of collision on a vehicle movement path on which the autonomous vehicle turns based on the actual yaw rate;

determining, by the autonomous driving controller, a yaw rate compensation torque for compensating for the difference between the target yaw rate and the actual yaw rate upon concluding that there is the risk of the collision; and determining, by the autonomous driving controller, driving torque and regenerative braking torque of each in-wheel motor in the autonomous vehicle for collision prevention and turning stability, or determining whether to apply hydraulic braking torque of a hydraulic braking device according to a magnitude of the yaw rate compensation torque, wherein the autonomous driving controller is configured to perform a control operation to selectively apply the driving torque or the regenerative braking torque to each in-wheel motor using the yaw rate compensation torque when the difference between the target yaw rate and the actual yaw rate occurs due to generation of a steering angle according to steering wheel operation of a driver while the autonomous driving mode is switched to the manual driving mode during turning of the autonomous vehicle.

2. The method of claim 1, wherein the determining of whether there is the risk of the collision includes:

estimating the vehicle movement path of the autonomous vehicle during turning based on the actual yaw rate when the difference between the target yaw rate and the actual yaw rate is equal to or greater than a reference value; and determining whether there is the risk of the collision of the autonomous vehicle with an obstacle or another vehicle on the estimated vehicle movement path.

3. The method of claim 2, wherein the determining of whether the difference occurs between the target yaw rate and the actual yaw rate is performed upon concluding that a steering angle changes due to steering wheel operation of the driver.

4. The method of claim 3, wherein upon concluding that the steering angle change according to the steering wheel operation of the driver does not occur, switching to the manual driving mode by the autonomous driving controller is normally controlled.

5. The method of claim 2, wherein the target yaw rate is a yaw rate value during turning along an autonomous driving path predetermined in the autonomous driving mode of the autonomous vehicle, and the actual yaw rate is a yaw rate value obtained by adding a yaw rate generated by a steering angle change in response to steering wheel operation of the driver to the target yaw rate.

6. The method of claim 2, wherein upon concluding that there is no risk of collision on the estimated vehicle movement path, switching to the manual driving mode by the autonomous driving controller is normally controlled.

7. The method of claim 1, wherein, when the difference between the target yaw rate and the actual yaw rate is less than a reference value, switching to the manual driving mode by the autonomous driving controller is normally controlled.

8. The method of claim 1, wherein the yaw rate compensation torque is determined by:

obtaining a yaw rate difference value, which is an absolute value, by subtracting the actual yaw rate from the target yaw rate;

obtaining a yaw rate change rate by dividing the yaw rate difference value by a transition time taking from the autonomous driving mode to the manual driving mode; and multiplying the yaw rate change rate by inertia, which is a value predetermined based on vehicle specifications.

9. The method of claim 1, wherein, when the yaw rate compensation torque is less than a predetermined value, switching to the manual driving mode by the autonomous driving controller is normally controlled.

10. The method of claim 1, wherein, when the yaw rate compensation torque is greater than a predetermined value and smaller than a maximum driving torque of the in-wheel motor, the autonomous driving controller is configured to determine the driving torque and the regenerative braking torque of each in-wheel motor in the autonomous vehicle for the collision prevention and the turning stability, and to instruct a motor controller communicatively connected to the autonomous driving controller to apply the determined driving torque and the determined regenerative braking torque of each in-wheel motor.

11. The method of claim 10, wherein, when the motor controller performs a control operation to apply the driving torque or the regenerative braking torque to each in-wheel motor based on the driving torque and the regenerative braking torque of each in-wheel motor commanded from the autonomous driving controller, the driving force or the regenerative braking force of each in-wheel motor allowing collision avoidance is exerted.

12. The method of claim 11, wherein, when the driving force or the regenerative braking force of each in-wheel motor is exerted, switching to the manual driving mode by the autonomous driving controller is normally controlled.

13. The method of claim 1, wherein, when the yaw rate compensation torque is smaller than a sum of a maximum driving torque of the in-wheel motor and the hydraulic braking torque of the hydraulic braking device, the autonomous driving controller is configured to determine whether to apply the hydraulic braking torque to the hydraulic braking device mounted on each wheel in addition to the driving torque and the regenerative braking torque of each in-wheel motor for preventing collision and achieving stable turning, configured to instruct a motor controller communicatively connected to the autonomous driving controller to apply the determined driving torque and the determined regenerative braking torque of each in-wheel motor, and configured to instruct a braking controller to determine whether to apply the hydraulic braking torque to the hydraulic braking device mounted on each wheel of the autonomous vehicle.

14. The method of claim 13, wherein the motor controller is configured to perform a control operation to apply the driving torque or the regenerative braking torque to each in-wheel motor based on the driving torque and the regenerative braking torque of each in-wheel motor commanded by the autonomous driving controller, and wherein the braking controller is configured to perform a control operation to apply hydraulic braking torque to at least one selected among hydraulic braking devices mounted on respective wheels, so that the driving force or the regenerative braking force of each in-wheel motor allowing collision avoidance is exerted while the hydraulic braking force is exerted.

15. The method of claim 14, wherein, when the driving force or the regenerative braking force of each in-wheel motor is exerted and the hydraulic braking force is exerted on at least one selected among the respective wheels, switching to the manual driving mode by the autonomous driving controller is normally controlled.

16. The method of claim 1, wherein, when the yaw rate compensation torque is greater than a sum of a maximum driving torque of the in-wheel motor and the hydraulic braking torque of the hydraulic braking device, the autonomous driving controller is configured to perform a control operation to forcibly maintain the autonomous driving mode without changing a driving mode thereof to the manual driving mode.

17. An autonomous vehicle comprising:
a controller including a processor; and
a non-transitory storage medium configured for storing an algorithm for an operation of the processor, wherein the processor is configured to:
  determining whether there is a request for switching to a manual driving mode during turning of the autonomous vehicle;
  determining whether a difference occurs between a target yaw rate and an actual yaw rate in a transition section in which an autonomous driving mode is changed to the manual driving mode;
  determining whether there is a risk of collision on a vehicle movement path on which the autonomous vehicle turns based on the actual yaw rate;
  determining a yaw rate compensation torque for compensating for a difference between the target yaw rate and the actual yaw rate upon concluding that there is the risk of the collision; and
  determining driving torque and regenerative braking torque of each in-wheel motor in the autonomous vehicle for collision prevention and turning stability, or determining whether to apply hydraulic braking torque of a hydraulic braking device according to a magnitude of the yaw rate compensation torque,
  wherein the controller is configured to perform a control operation to selectively apply the driving torque or the regenerative braking torque to each in-wheel motor using the yaw rate compensation torque when a difference between the target yaw rate and the actual yaw rate occurs due to generation of a steering angle according to steering wheel operation of a driver while the autonomous driving mode is switched to the manual driving mode during turning of the autonomous vehicle.

18. The autonomous vehicle of claim 17, wherein for the determining of whether there is the risk of the collision, the controller is configured for:
  estimating the vehicle movement path of the autonomous vehicle during turning based on the actual yaw rate when the difference between the target yaw rate and the actual yaw rate is equal to or greater than a reference value; and
  determining whether there is the risk of the collision of the autonomous vehicle with an obstacle or another vehicle on the estimated vehicle movement path.

19. The autonomous vehicle of claim 17, wherein the controller is configured for determining the yaw rate compensation torque by:
  obtaining a yaw rate difference value, which is an absolute value, by subtracting the actual yaw rate from the target yaw rate;
  obtaining a yaw rate change rate by dividing the yaw rate difference value by a transition time taking from the autonomous driving mode to the manual driving mode; and
  multiplying the yaw rate change rate by inertia, which is a value predetermined based on vehicle specifications.

20. The autonomous vehicle of claim 17, wherein, when the yaw rate compensation torque is greater than a predetermined value and smaller than a maximum driving torque of the in-wheel motor, the controller is configured to determine the driving torque and the regenerative braking torque of each in-wheel motor in the autonomous vehicle for the collision prevention and the turning stability, and to instruct a motor controller communicatively connected to the autonomous driving controller to apply the determined driving torque and the determined regenerative braking torque of each in-wheel motor.

21. A method of controlling switching to a manual driving mode of an autonomous vehicle, the method comprising:
  determining, by an autonomous driving controller, whether there is a request for switching to the manual driving mode during turning of the autonomous vehicle;
  determining, by the autonomous driving controller, whether a difference occurs between a target yaw rate and an actual yaw rate in a transition section in which an autonomous driving mode is changed to the manual driving mode;
  determining, by the autonomous driving controller, whether there is a risk of collision on a vehicle movement path on which the autonomous vehicle turns based on the actual yaw rate;
  determining, by the autonomous driving controller, a yaw rate compensation torque for compensating for a difference between the target yaw rate and the actual yaw rate upon concluding that there is the risk of the collision; and
  determining, by the autonomous driving controller, driving torque and regenerative braking torque of each in-wheel motor in the autonomous vehicle for collision prevention and turning stability, or determining whether to apply hydraulic braking torque of a hydraulic braking device according to a magnitude of the yaw rate compensation torque,
  wherein, while the autonomous driving mode is switched to the manual driving mode during turning of the autonomous vehicle, when there is the risk of collision, by forcibly maintaining the autonomous driving mode without switching to the manual driving mode, the autonomous vehicle is driven along a path allowing collision avoidance.

* * * * *